Figure 1:
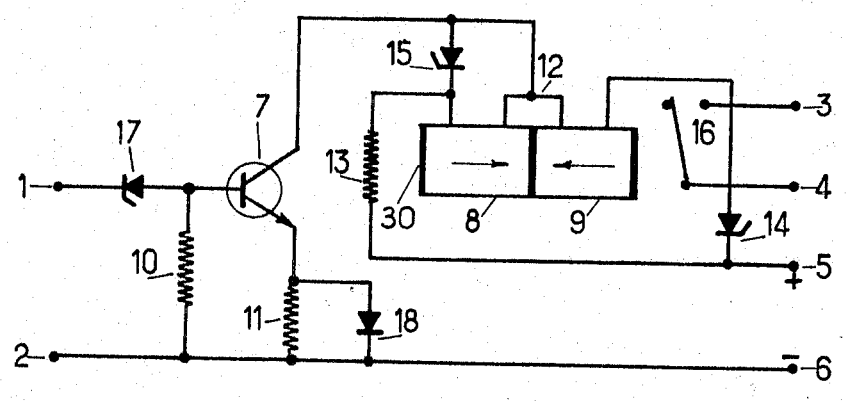

3,325,696
ELECTRONIC RELAY CONTROL SYSTEM
Robert Dallemagne, 34 Rue Pieplu,
Conflans-Sainte-Honorine, France
Filed Nov. 5, 1964, Ser. No. 409,228
Claims priority, application France, Dec. 17, 1963,
957,411
5 Claims. (Cl. 317—155.5)

This invention relates to a new electronic control device, capable of operating an electromechanical relay, and therethrough a working circuit or apparatus, from relatively small variations in a direct-current voltage applied to the input of said device. The working circuit or apparatus may consist, for instance, of an alarm device or of apparatus for the automatical replacement of momentarily faulty equipment by stand-by equipment of similar characteristics. Generally speaking, the working circuit may consist of any form of electrical apparatus capable of being actuated by the closing (or opening) of contacts provided in an electromechanical relay. The device of the invention was originally designed in view of controlling so-called "carrier-current source permutators," i.e. switching equipment the function of which, in a carrier-current communication system, is that of replacing a faulty carrier-current generator by a similar one in working order. In this case, the control voltage operating the device of the invention is derived from the output of the normally-in-service generator. It is obvious that such a control voltage could be derived in a similar manner from the output of any electrical apparatus, the output of which is to be monitored, this being done by well-known means which are no part of the invention.

An advantage of the device of the invention is that it requires but a low power for operating an electromechanical relay, the operation of which would require a comparatively high power, were it to be directly operated from a direct-current control source.

Another advantage of the device of the invention resides in its ability to respond to a small relative deviation of the control voltage applied thereto from its normal value, whatever be the direction of this deviation.

The device of the invention essentially uses an original and simple combination of a two-winding electromechanical relay with a transistor and at least two Zener diodes (also known as "breakdown" diodes). Still another advantage of this combination is that it is "self-monitoring," i.e. that the occurrence of a fault in the transistor or in either of the Zener diodes results in the operation of the device and eventually of any alarm system controlled thereby.

According to the invention, there is provided an electronic control device for operating, from the variations of a direct-current control voltage applied thereto with respect to a reference voltage value, an electromechanical relay having at least one contact pair connected with a working circuit and a first and a second winding, said device comprising a transistor having base, collector and emitter electrodes, input circuit means for applying said control voltage to the base-emitter circuit of said transistor, a pair of direct-current supply terminals for biasing said transistor, a first circuit connecting said collector to one of said supply terminals through said first winding and a series resistor, a first Zener diode shunted across said first winding, a second circuit connecting same said collector to said one of said supply terminals through the series assembly of said second winding and a second Zener diode, and a connection between the other one of said supply terminals and a common point to which said emitter electrode is connected through a further resistor.

In a first variant of embodiment of the invention, said input circuit means comprise a pair of input terminals a Zener diode connecting one of said input terminals to the base electrode of said transistor, and a direct connection between said common point and the second one of said input terminals.

In a second variant of embodiment of the invention, said input circuit means further comprise means for applying to the second one of said input terminals a biasing voltage derived from said supply terminals.

In still another variant of embodiment of the invention, said further resistor is provided with a semiconductor diode in parallel connection therewith.

Figure 2:
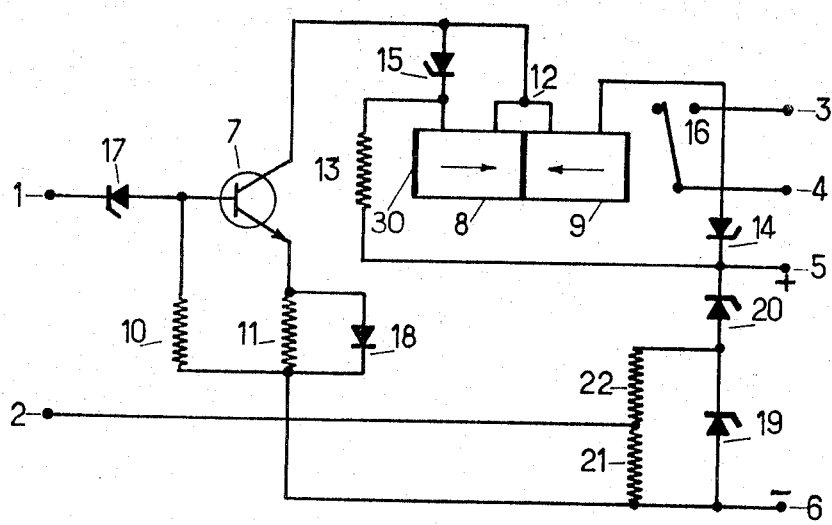
Figure 3:
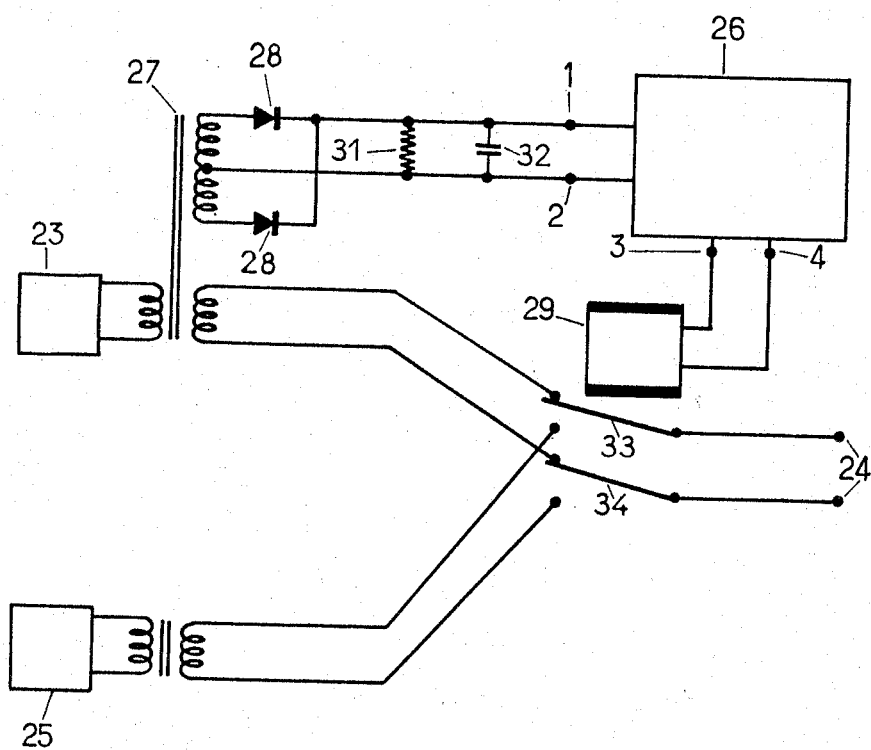

The advantages of the invention will be better understood from the hereinafter given detailed description of some of its embodiments, made in connection with the appended drawings, of which:

FIGS. 1 and 2 show two simple embodiments of the invention; and FIG. 3 shows, by way of example, the application of the invention to the automatic switching-off of a defective electric power generator and switching-in of a substitute power generator.

Referring to FIG. 1, the drawing shows a device according to the invention, including two input terminals 1 and 2 between which a direct-current control voltage is applied. Terminals 3 and 4 are connected with a pair of contacts 16 in relay 30 and are the utilization terminals for a working circuit (not shown in the drawing). Terminals 5 and 6 are direct-current supply terminals for the biasing of transistor 7 (assumed to be an NPN transistor), 5 being the positive and 6 the negative terminal, fed from a direct-current source (not shown in the drawing). Terminal 6 is directly connected with input terminal 2, which constitutes the common point to the input and output circuits of transistor 7. The normal position of contact 16 is supposed to be the closed (right-hand) position.

The device essentially comprises said transistor 7 and relay 30, the latter provided with first and second windings 8 and 9. The base electrode of 7 is connected on one hand with input terminal 1 and on the other hand through resistor 10 to terminal 2 and the common point 6. The function of 10 is to ensure the base electrode of 7 a suitable biasing potential, of such a value that transistor 7, when a control voltage of normal value is applied between 1 and 2, operates at a working point where its current gain (amplification factor) is fairly high. The control voltage which will be applied between 1 and 2 is of such polarity as to render 1 positive with respect to 2. The emitter electrode of 7 is connected with terminal 2 through a further resistor 11, which ensures the emitter a proper direct-current potential and also causes degenerative feedback for the collector current of 7. The collector of 7 is connected with terminal 5 on one hand through the first relay winding 8 and resistor 13 in series therewith, and on the other hand through the second relay winding 9 and the Zener diode 14. Another Zener diode 15 is in parallel connection with winding 8.

As already mentioned, the contact pair 16 is connected with terminals 3 and 4, to which an external working circuit may be connected.

In FIG. 1, a third Zener diode 17 is also shown, connecting the base electrode of 7 with the input terminal 1, and an ordinary semiconductor diode 18 is connected across resistor 11. The use of the latter Zener and ordinary diodes improves the operation of the device, as it will be explained later on, but they may be dispensed with.

The Zener diodes 14 and 15 are so poled that, when the breakdown effect occurs at their nominal critical voltage (Zener voltage), direct currents from terminal 5 flow toward the collector of transistor 7. The extra Zener diode 17 is so poled that current flows through it toward the base electrode of 7 only when the control voltage applied between terminals 1 and 2 exceeds the critical voltage of 17 and is of the proper polarity.

It will first be assumed that the value U of the control voltage applied between 1 and 2 is equal to the normal value $U_0$ of said control voltage. A direct-current of normal value then flows through 8 toward the collector of 7. Relay 30 is energized and contact 16 comes on its "normal operation" position (righthand position in FIG. 1). This state of things must persist so long as voltage U remains between $(U_0+u)$ and $(U_0-u)$, $u$ being the admissible deviation. On the contrary, the position of contact 16 must change as soon as U exceeds $(U_0+u)$ or falls below $(U_0-u)$. Assuming first the Zener diode 17 to be replaced by a direct connection, the voltage applied to the base electrode of 7 (with respect to the "ground point" 2) would be U. If diode 17 is inserted, the latter voltage takes a lower value $U_1$, equal to U less the critical (Zener) voltage of 17 (this being true so far as U exceeds the latter critical voltage). The variations of $U_1$ are the same as those of U, but the normal value of $U_1$, is lower than $U_0$. This shows that the relative variations of $U_1$ are larger than those of U; in other words, the use of diode 17 allows to reduce the value $U_0$ of U, which may be too high for the correct operation of the transistor, without reducing the absolute variations of U, and thus increases the sensitivity of the device.

The intensity of the collector current of 7, in the normal condition, is determined by the voltage applied to its input and by the value of the feedback resistor 11. The Zener diode 14 prevents current of flowing through the second winding 9 of relay 30. The whole collector current thus flows through 8 and, as already explained, the contact 16 of relay 30 assumes its normal position. At the same time, the collector current produces, between the terminals of the series assembly of the resistances of 8 and resistor 13, a voltage drop which, however, remains lower than the breakdown voltage of the Zener diode 14.

If the control voltage U increases and exceeds the upper admissible value, the collector current of 7 also increases and the voltage drop across the just-mentioned series assembly becomes higher than the Zener voltage of 14. A current flows through 14 and winding 9 and, thanks to the opposite winding directions of 8 and 9, deenergizes relay 30, whose contact 16 assumes its "abnormal condition" position (left-hand position in FIG. 1) as soon as the current intensity in 9 reaches a high enough value.

The other Zener diode 15 has for its purpose the limitation of the voltage developed across winding 8 and, consequently, the current intensity in said winding. This prevents the increase in the current in 8 of opposing the action of the current in 9. The operation of relay 30 is thus made possible for a relatively small increase of the control voltage applied between 1 and 2.

If, on the contrary, the control voltage U decreases, the intensity of the collector current of 7 is also reduced. When the collector current falls to an intensity corresponding to the lower admissible value for U, the relay is deenergized. It is obvious that the same effect is experienced if the control voltage suddenly disappears.

If transistor 7 becomes defective, i.e. if its gain falls to too low a value, everything occurs as if U had decreased. If a short-circuit occurs between the collector and the emitter of 7, everything occurs as if U had increased. It may easily be seen that a short-circuit in diode 15 or diode 16 also brings contact 16 to its abnormal position.

Diode 18 which, in the embodiment of the invention shown in FIG. 1, is in parallel connection with resistor 11, has for its function that of decreasing the apparent resistance value of the latter at the higher current intensities, thus allowing a more rapid increase in the collector current of 7 when the increase in the control voltage at the input of the device exceeds a predetermined value. An improvement to the device of the invention, thanks to which it is possible to use Zener diodes having optimum characteristics as input diodes (diode 17 of FIG. 1) will now be described in connection with FIG. 2.

It is well known that the best Zener diodes, from the viewpoint of maximum accuracy in the value of their critical voltage, and minimum voltage interval between their non-conducting and avalanche conditions are those having a Zener voltage in the vicinity of 7 volts.

Since an input voltage higher than 7 volts is not always available as a control voltage, it is sometimes advisable to add to said control voltage a well-defined and constant auxiliary voltage, to make it possible to use such optimum-voltage diodes. This is the purpose of the arrangement of FIG. 2, in which elements similar to and playing the same part as those of FIG. 1 have been designated by the same reference numerals.

Referring now to FIG. 2, there are provided, between the direct-current supply terminals 5 and 6, two series-connected Zener diodes 19 and 20. A voltage divider consisting of resistors 21, 22 is in parallel connection with diode 19. The common point to the series-connected resistors 21 and 22 is connected with the input terminal 2. Terminal 6, like in FIG. 1, is connected with the common point to resistors 10 and 11.

The auxiliary voltage added to the control voltage U applied to the input of the device has the value:

$$V_{21}=R_{21}V_{19}/(R_{21}+R_{22})$$

where $R_{21}$ and $R_{22}$ are the resistances of resistors 21 and 22, respectively, and $V_{19}$ the Zener voltage of diode 19.

The input voltage to transistor 7 is then equal to U less the Zener voltage of 17 and plus the auxiliary voltage $V_{21}$; thus, this input voltage equals $(U_1+V_{21})$.

Contact 16 of relay 30 may be used for operating an alarm device for the signalling of disappearance or excessive variations of the control voltage. It may also be used to operate switching apparatus, for example for power supply sources replacement. An application of the device in this line is shown in FIG. 3, to the change-over from a defective generator to a stand-by one.

In normal operation, generator 23 feeds a utilization circuit connected at terminals 24 through the contacts 33, 34 of relay 29. If generator 23 ceases to deliver the proper voltage, it is switched off by contacts 33, 34, which change their position so as to switch in the substitute generator 25. This is effected as follows, with the aid of apparatus of the kind shown in FIGS. 1 and 2, schematically shown as 26 in FIG. 3. The control voltage for 26 is derived from the output of generator 23 through transformer 27, rectifiers 28, 28, resistor 31 and capacitor 32. A contact, such as (3, 4) of FIG. 1, opens or closes the energization circuit of relay 29, fed from an independent current source (not shown in the drawing). The latter relay operates the substitution of 25 for 23 as already explained and connects 25 with the utilization circuit connected at 24.

What is claimed is:

1. An electronic control device for operating, from the variations of a direct-current control voltage of a predetermined polarity applied thereto with respect to a reference voltage value, an electromechanical relay having at least one contact pair connected with a working circuit and a first and a second winding having a common point and working in opposition for currents entering said windings in the same direction at said common point, said device comprising a transistor having base, collector and emitter electrodes, input circuit means for applying said control voltage to the base-emitter circuit of said transistor, a direct connection between said common point and said collector electrode a first and a second direct-current supply terminal for a direct-current source for biasing said transistor, a first circuit connecting said collector electrode to said first terminal through said first winding and a first resistor in series connection therewith, a first Zener diode shunted across said first winding and so poled that the voltage drop caused across said first winding by the direct-current flowing from said first terminal through said winding to said collector electrode and applied to said first Zener diode has the same polarity as the breakdown voltage of said first Zener diode, a second circuit connecting said collector to said one of said supply terminals and including in the series assembly said second winding and a second Zener diode so poled that the direct-current flowing from said first terminal to said collector electrode through said second winding has the same direction as the current through said second Zener diode in the breakdown condition thereof, a second resistor, and a direct connection between said second terminal and a potential reference point to which said emitter electrode is connected through said second resistor.

2. A control device as claimed in claim 1 comprising a third Zener diode inserted in series in said input circuit means, and so poled that the control voltage applied thereto is of the same polarity as its breakdown voltage.

3. A control device as claimed in claim 1 comprising an extra semiconductor diode connected in parallel with said second resistor, the normal conduction direction of latter said diode being the same as that of the voltage drop across said second resistor caused by the emitter current of said transistor.

4. A control device as claimed in claim 1 comprising a constant voltage source and in which a constant direct-current voltage from said constant voltage source is added to said control voltage in said input circuit means.

5. A control device as claimed in claim 4, in which said constant voltage source includes a voltage divider comprising at least one further Zener diode fed from said direct-current supply terminals and a voltage divider made of two series-connected auxiliary resistors, the assembly of which is connected across said further Zener diode in its breakdown conduction direction.

References Cited

UNITED STATES PATENTS

| | | | |
|---|---|---|---|
| 3,010,053 | 9/1961 | Schubert | 217—148.5 |
| 3,084,311 | 4/1963 | Culbertson | 317—148.5 |
| 3,158,791 | 9/1964 | Deneen et al. | 317—148.5 |
| 3,254,269 | 5/1966 | Eisele | 317—155.5 |

MILTON O. HIRSHFIELD, *Primary Examiner.*

J. A. SILVERMAN, *Assistant Examiner.*